(12) United States Patent
Gormley et al.

(10) Patent No.: US 10,969,050 B2
(45) Date of Patent: Apr. 6, 2021

(54) AIR PRESSURE ATTENUATION DEVICE

(71) Applicant: Heriot-Watt University, Edinburgh (GB)

(72) Inventors: Michael Gormley, Edinburgh (GB); David Paul Campbell, West Lothian (GB)

(73) Assignee: HERIOT-WATT UNIVERSITY, Edinburgh (GB)

( * ) Notice: Subject to any disclaimer, the term of this patent is extended or adjusted under 35 U.S.C. 154(b) by 40 days.

(21) Appl. No.: 16/468,705

(22) PCT Filed: Dec. 19, 2017

(86) PCT No.: PCT/IB2017/058111
§ 371 (c)(1),
(2) Date: Jun. 12, 2019

(87) PCT Pub. No.: WO2018/172841
PCT Pub. Date: Sep. 27, 2018

(65) Prior Publication Data
US 2019/0338879 A1 Nov. 7, 2019

(30) Foreign Application Priority Data
Jan. 4, 2017 (EP) ..................................... 17000011

(51) Int. Cl.
*F16L 55/04* (2006.01)
*F16L 55/054* (2006.01)
*E03C 1/122* (2006.01)

(52) U.S. Cl.
CPC .......... *F16L 55/054* (2013.01); *E03C 1/1222* (2013.01); *F16L 55/04* (2013.01)

(58) Field of Classification Search
CPC ....... F16L 55/04; F16L 55/054; F24D 3/1016; F24D 3/1041; F24D 3/1008; A61M 2205/3341
USPC ...................... 138/26, 30; 220/720, 721, 723
See application file for complete search history.

(56) References Cited

U.S. PATENT DOCUMENTS

| | | | |
|---|---|---|---|
| 2,875,787 A | | 3/1959 | Evans |
| 3,536,102 A | * | 10/1970 | Zahid Abduz ........ F16L 55/052 138/30 |
| 4,598,737 A | * | 7/1986 | Bentley ................ F16L 55/054 138/30 |
| 4,732,176 A | * | 3/1988 | Sugimura ................ F15B 1/16 138/30 |
| 5,036,879 A | | 8/1991 | Ponci |
| 5,735,313 A | * | 4/1998 | Jenski, Jr. ........... F04B 11/0016 138/30 |
| 5,860,452 A | * | 1/1999 | Ellis ...................... F16L 55/054 138/26 |

(Continued)

FOREIGN PATENT DOCUMENTS

EP      1918627 A2      5/2008

*Primary Examiner* — Patrick F Brinson
(74) *Attorney, Agent, or Firm* — 24IP Law Group USA, PLLC; Timothy DeWitt (57) ABSTRACT

A positive air pressure attenuation device (1) comprising:—a housing (3) with an inner central portion (6) forming a channel (7); and an elastic flexible inflatable reservoir (8) associated to the inner central portion (6), whereby the inner central portion (6) has a wall portion (60) with a plurality of openings (61) forming passages between the channel (7) and the reservoir chamber (8A).

21 Claims, 7 Drawing Sheets

(56) References Cited

U.S. PATENT DOCUMENTS

| | | | | |
|---|---|---|---|---|
| 6,328,071 | B1* | 12/2001 | Austin | F04D 13/16 |
| | | | | 138/30 |
| 7,025,092 | B2 | 4/2006 | Swaffield et al. | |
| 2004/0016466 | A1* | 1/2004 | Lombari | F24D 3/1008 |
| | | | | 138/30 |
| 2005/0034774 | A1* | 2/2005 | Lombari | F16L 55/054 |
| | | | | 138/30 |
| 2005/0051223 | A1* | 3/2005 | Lombari | F16L 55/052 |
| | | | | 138/30 |
| 2007/0284010 | A1* | 12/2007 | Underwood | E21B 4/14 |
| | | | | 138/30 |

* cited by examiner

AIR PRESSURE ATTENUATION DEVICE

The invention relates to a device for suppressing and/or alleviating pressure transients in building drainage, especially in high rise building drainage.

The invention relates thus to a device for suppressing/alleviating the propagation of pressure waves in a building drainage.

The problem of transient pressure is a quite serious problem. Indeed, pressure transients in drainage is a cause of noises, trap seal oscillation, water seal problems in floor traps, meaning possible smell problems, as well as path for virus transmission, etc.

For solving these problems, the PAPA™ system has been proposed. Said system is for example disclosed in U.S. Pat. No. 7,025,092.

The system according to said patent is:

A positive air pressure attenuation device specifically adapted for use in a drainage system of a building, the device comprising:

- a housing including structure for connecting the housing to the system and having an inlet defined by an inlet area, said structure being located proximate said inlet area, an outlet defined by an outlet area, and a central portion, the inlet area being linked to the outlet area by means of a separator located in the central portion of the housing;
- a flexible reservoir secured to the housing, the flexible reservoir being operable on a positive air pressure transient within the drainage system; and
- an external casing covering the flexible reservoir and at least a part of the housing, said casing presenting an air-admitting passageway so that the flexible reservoir is in permanent contact with atmospheric air during operation of the device.
- Such a device can not be used in the drainage stack as such, but has to be mounted adjacent to an air admittance valve. It means that extra space is required, as well extra junctions.
- Moreover for large buildings or high rise buildings, the problem of air transient pressure is not always adequately solved, especially for 50 storeys or more building drainage stack with a main stack diameter generally of 150 200 mm.
- A surge tank for controlling pressure surges of transients in pipelines is disclosed in EP1918627.
- FIG. 5 of said document discloses a vertical surge tank comprising:
- A pressure housing including a structure for connecting the housing to a inlet/outlet port of a sewage system and being associated to a pipe acting as nozzle member with a bottom end connected to the inlet/outlet port, a top closed end and an inner central portion located within the housing, said inner central portion forming a channel for liquid material issuing from the single inlet/outlet port, and
- An elastic flexible inflatable reservoir associated to the inner central portion of the pipe. The inflation of the reservoir is carried against the gas pressure within the pressure housing.
- The central portion of the pipe is provided with openings forming passages between the pipe channel and the reservoir chamber. The lower elongated openings are located into a cylindrical throat to which the bottom portion of the flexible reservoir is attached, whereby a small circular gap is formed between the cylindrical bottom portion of the flexible reservoir and the outer wall of the inner pipe.
- The surge tank of EP1918627 is not provided with an outlet distinct from the inlet, whereby the pipe is not part of the draining system in which the sewage liquid is flowing from a top inlet towards a bottom outlet. The inner pipe of the surge tank is connected at its bottom end to one single inlet/outlet port. The surge tank is placed in parallel to a draining pipe. Such a surge tank is not suitable for suppressing and/or alleviating pressure transients in building drainage, as due to the fact that the inner pipe is not a draining pipe, the pressure in the inner pipe and in the flexible chamber will always be the same, while when liquid is flowing from top to the bottom, a difference of pressure is generated between the front of the liquid flow and the rear of the liquid flow, whereby enabling air from the chamber to flow directly.
- As it is the case for the PAPA® device, such a surge tank can not be used in the drainage stack as such, but has to be mounted adjacent to an air admittance valve. It means that extra space is required, as well extra junctions.

The invention relates to a positive air pressure attenuation device which can be part of the main drainage stack (i.e. comprising a portion of the drainage pipe for waste (solid and/or liquid), and which is suitable and effective for air pressure attenuation for high rise buildings. As the device of the invention is part of the main drainage (vertical or substantially vertical), it is effective for attenuating positive air pressure for several storeys, as well as for various flats located at the same storey, while limiting the required space for its installation. Moreover, the device can be located outside the various flats.

Tests with a device of the invention have proved that it was a perfect in-line device effective at attenuating the type of pressure surge experienced in very tall buildings (characterised by very high pressures and large air volume. Air pressure transients could be reduced by up to 90% and air volume of 135 litres could be safely dissipated. The tests have moreover shown added benefit of equalising negative reflections within the main drainage pipe, which is an additional bonus effect of the device of the invention.

Tests have shown that the device of the invention with a 1 mm thick elastic rubber flexible reservoir was adequate to withstand positive air pressure transients up to 20 kPa (2.039 mH$_2$O)

The elastic expandable flexible reservoir ensures also an advantageous attenuation of negative pressure transients in the drainage system associated with operation of the device.

The device of the invention will alleviate positive, as well as negative pressure transients in the substantially vertical drainage pipes The invention is a positive air pressure attenuation device (1) specifically adapted for use in a drainage system (D) of a building for draining at least draining liquid material, the device comprising:

- a housing (3) including a structure for connecting the housing (3) to the drainage system (D) and being associated to a pipe (3A) with an inlet (4), an outlet (5), and an inner central portion (6) forming a channel (7) for conducting draining liquid material from the inlet (4) towards the outlet (5), said channel (7) having a central axis (A); and an elastic flexible inflatable reservoir (8) associated to the inner central portion (6) of the pipe (3A), the reservoir (8) being operable on a positive air pressure transient within the drainage system (ID), said flexible reservoir (8) defining a reservoir chamber (8A) with a variable inflatable volume, said flexible reservoir (8) being at least partly made to withstand a positive air pressure transient of at least 5,000 Pa, advantageously comprised between 10,000 Pa and 2,000,000 Pa or even more, such as up to 1,000,000 Pa, for example between 10,000 Pa and 500,000 Pa, whereby the housing (3) forms an external casing (3) covering at least partly the flexible reservoir (8) and having at least one air passage way (10) adapted for ensuring at least the portion of the flexible reservoir located into the housing (3) to be in contact with atmospheric air during operation of the device, whereby the inner central portion (6) of the pipe (3A) has a wall portion (60) extending within the reservoir chamber (8A), said wall portion (60) being provided with a plurality of openings (61) forming passages between the channel (7) and the reservoir chamber (8A), said wall portion (60) defining a total closed surface within the reservoir chamber (8A) and a total open surface between the channel (7) and the reservoir chamber (8A), whereby said plurality of openings (61) comprises: (a) one or more than one, preferably two or more than two lower elongated opening(s) (61L) located in the inner central portion (6) adjacent to the outlet (5), said one or more lower elongated opening(s) (61L) having a portion with an axis (B) substantially parallel to the central axis (A) of the inner central portion (6), and (b) one or more than one, preferably two or more than two upper opening(s) (61U), advantageously upper elongated opening(s), located in the inner central portion (6) adjacent to the inlet (4), said plurality of openings (61) defining a total open surface such that the ratio total open surface of the openings (61)/total closed surface of the wall (60) is comprised from 1:100 to 1:4, advantageously from 1:50 to 1:8, preferably from 1:40 to 1:10.

The device of the invention has thus a housing which will form a part of the drainage stack pipe, through which grey waters and/or black waters, like waste water from toilets, bathrooms, kitchens, etc. issued from an upper stack drain pipe are flowing down into a bottom drain pipe.

Said plurality of openings (61) comprises advantageously also one or more intermediate openings (61I) located in the inner central portion (6) extending at a level comprised between the plane perpendicular to the central axis (A) comprising the upper point of the lower elongated opening(s) (61L), and the plane perpendicular to the central axis (A) comprising the lower point of the upper opening(s) (61U).

The positive air pressure attenuation device of the invention has advantageously one or more of the following further characteristics:

the device comprises a housing (3) including a structure for connecting the housing (3) to the drainage system (D) and being associated to a pipe, like a draining pipe (3A) traversing the housing (3), said draining pipe (3A) having an open inlet (4) outside the housing for the inlet of draining liquid material, an open outlet (5) outside the housing which is distinct from the inlet (4) and which is adapted for the exhaust of draining liquid material, and an inner central portion (6) located within the housing (3) between said inlet (4) and outlet (5), said inner central portion (6) forming a channel (7) for conducting draining liquid material from the inlet (4) towards the outlet (5), said channel (7) having a central axis (A);

the one or more upper openings 61U is/are elongated opening(s) having a portion with an axis (B) substantially parallel to the central axis (A) of the channel (7).

the one or more intermediate openings 61I is/are elongated opening(s) having a portion with an axis (B) substantially parallel to the central axis (A) of the channel (7).

the one or more lower openings (61L), the one or more upper openings (61U) and the one or more intermediate openings (61I) are each elongated openings (or at least partly elongated openings).

The positive air pressure attenuation device comprises at least one line of openings comprising a lower opening (61L), an upper opening (61U), and a plurality of intermediate openings (61I), whereby said line of openings or said lines of openings extend parallel to the central axis (A) of the channel (7).

the inner central portion (6) is provided with a plurality of slot intermediate openings (61I) located between the lower elongated opening(s) and the upper opening(s), advantageously upper elongated opening(s), whereby two successive slot intermediate openings (61I) are distant from each other by a distance measured parallel to the central axis (A) in the range of 5 mm to 100 mm.

the slot intermediate openings (61I) and/or the slot lower opening(s) and/or the slot upper opening(s) have a length in the range of 5 mm to 300 mm, and an average breath in the range of 5 to 30 mm.

the inner central portion has a length in the range of 50 cm to 300 cm.

the flexible reservoir forms an elastic inflatable flexible containment in which the inner central portion (6) extends, said elastic inflatable flexible containment being made in a gas tight material.

the flexible reservoir defines a free chamber (8AF—the free chamber 8AF is a portion of the total reservoir chamber when inflated) outside the inner central portion (6), said free chamber (8AF) having a maximum volume limited within the housing (3), whereby the free chamber has a maximum volume in the range of 0.5 to 10 times, advantageously in the range of 0.5 to 5 times the volume of the inner central portion (6).

the at least one or more lower elongated has/have each an elongated portion (61LA) and a bottom portion (61LB) located downwards the elongated portion (61LA), whereby said bottom portion (61LB) has a breath or diameter comprised between 1.5 and 4 times the average breath of the elongated portion (61LA), said bottom portion (61LB) having preferably a substantially oval or circular form with a diameter or small diameter comprised between 1.5 and 4 times the average breath of the elongated portion (61LA).

during the operation of the device, the lower end of the reservoir chamber is adapted or shaped to form or is associated to an element (85) for forming a funnel shaped portion with a bottom communicating with the at least one or more lower elongated openings, so as to enable liquid material present in the reservoir chamber to flow through said at least one or more lower elongated openings back into the inner central portion (6).

the external casing (3) has a central axis (C) parallel to the central axis (A) of the inner central portion (6), but distant from the central axis (A) from the channel or inner central portion (6).

the inner central portion (6) is provided with three or more than three lines of elongated openings, said lines being parallel to the central axis (A) of the channel or inner central portion.

the flexible reservoir (8) defines outside the inner pipe of the housing a free volume varying in function of the pressure within the inner pipe from a minimum volume up to a maximum volume, whereby the minimum volume corresponds to a position of the flexible reservoir (8) with respect to the inner central portion (6) for which the flexible reservoir (8) is not inflated and has a flexible wall at least partly contacting the outer face of the central portion (6) of the pipe (3A), while the maximum volume corresponds to a position for which the flexible reservoir (8) is inflated and has a flexible wall at least partly contacting the external casing (3), whereby advantageously the flexible reservoir (8) is such that in its non inflated position, a portion of the wall of the flexible reservoir (8) is not contacting the outer face of the central portion (6) of the pipe (3A), whereby defining a minimum free chamber volume within the flexible reservoir (8), said minimum free chamber volume being advantageously comprised between about 2 to 10% of the maximum air volume of the inflated flexible reservoir (8) contacting the housing (3). Said minimum air volume forms a kind of air cushion, facilitating the inflation of the flexible reservoir. Said minimum air volume is advantageously comprised between about 2 to 10% of the maximum air volume of the inflated flexible reservoir contacting the external casing.

The elastic flexible inflatable reservoir (8) associated to the inner central portion (6) of the pipe (3A) is inflatable between a first position defining a minimum volume within the reservoir (8) and a second position defining a maximum volume within the reservoir (8), whereby in said first position the elastic flexible inflatable reservoir contacts a portion of the inner central portion of the pipe (3A) provided with at least one lower elongated opening (61L) so as to completely close at least one lower elongated opening (61L) extending between a lower end and an upper end, whereby in said second position the elastic flexible inflatable reservoir is moved away from the inner central portion so as to open the said lower elongated opening completely closed in the first position, whereby in said second position of the flexible inflatable reservoir (8), the distance between the flexible inflatable reservoir (8) and the lower elongated opening completely closed in the first position increases progressively from the lower end of said lower elongated opening.

the housing (3) has a central axis (C) parallel to the central axis (A) of the inner central portion (6), but distant or eccentric from the central axis (A) from the inner central portion (6).

combinations of one or more of said characteristics.

The invention relates also to a drainage system for a building comprising a drainage stack with at least one substantially vertical drainage portion, whereby said substantially vertical drainage portion comprises or is a positive air pressure attenuation device of the invention, as disclosed here above and having advantageously one or more of the above disclosed characteristics.

The invention further relates to the use of a positive air pressure attenuation device of the invention, in a drainage system of a building.

Details and characteristics of a preferred embodiment of a positive air pressure attenuation device of the invention will appear from the following description, in which reference is made to the attached drawings.

In said drawings.

Figure 1:
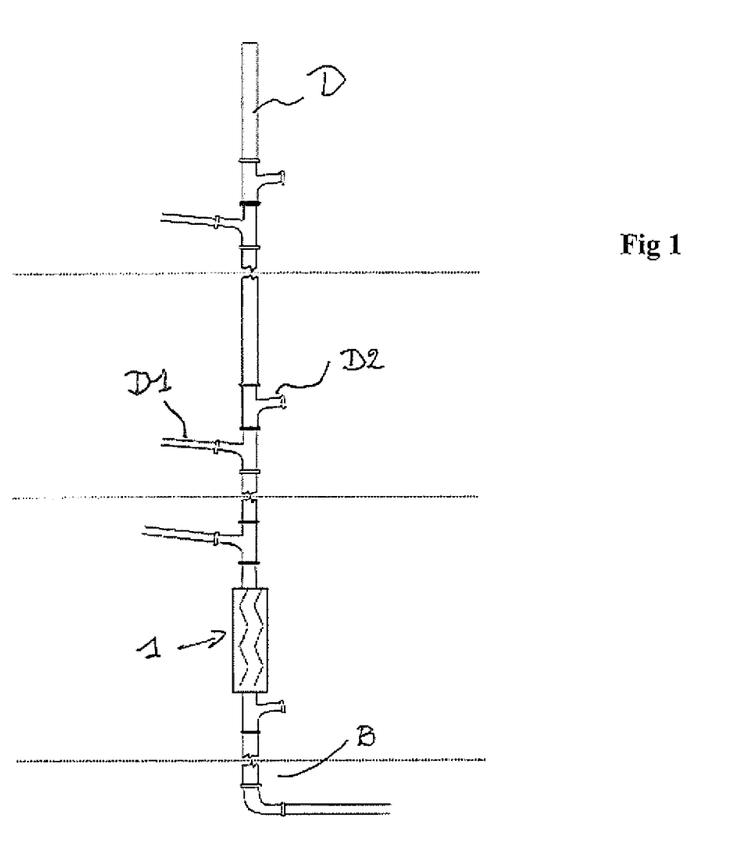
FIG. 1 is a partial schematic view of vertical main drainage pipe of a high storey building, said main drainage pipe being provided with a positive air pressure attenuation device according to the invention.

FIG. 1 is a schematic view of a vertical main drainage pipe D of a tall buildings (for example buildings having from 20 and more storeys with lateral connection pipes D1, D2, etc.) provided adjacent to the base of the stack (B), for example at underground level, with an air pressure attenuation device 1. The device is for example placed at ground level or underground level and is mounted directly on the vertical main drainage pipe D or as part of the main drainage pipe D. The device of the invention 1 forms thus part of the main drainage pipe D. For very tall buildings, one or more devices of the invention can be installed at one or more storey levels, for example one device for each set of 25 to 30 storeys.

The device of the invention 1 is thus a positive air pressure attenuation device (1) specifically adapted for use in a vertical or substantially vertical drainage system (D) of a building for draining at least draining liquid waste material, such as grey water, black water, etc. The air pressure device 1 is advantageously installed in-line with a vertical drainage stack or pipe, meaning that draining liquid material flows through the device from the top towards the bottom. The device 1 in FIG. 1 is installed above positive static pressure (back pressure zone) at the base or adjacent to the base of the stack. It is possible to install devices 1 at any floor above the base of the stack or drainage pipe. More than one devices (possibly successively mounted or distant the one from the other) can be installed on one single stack or drainage pipe.

Figure 2:
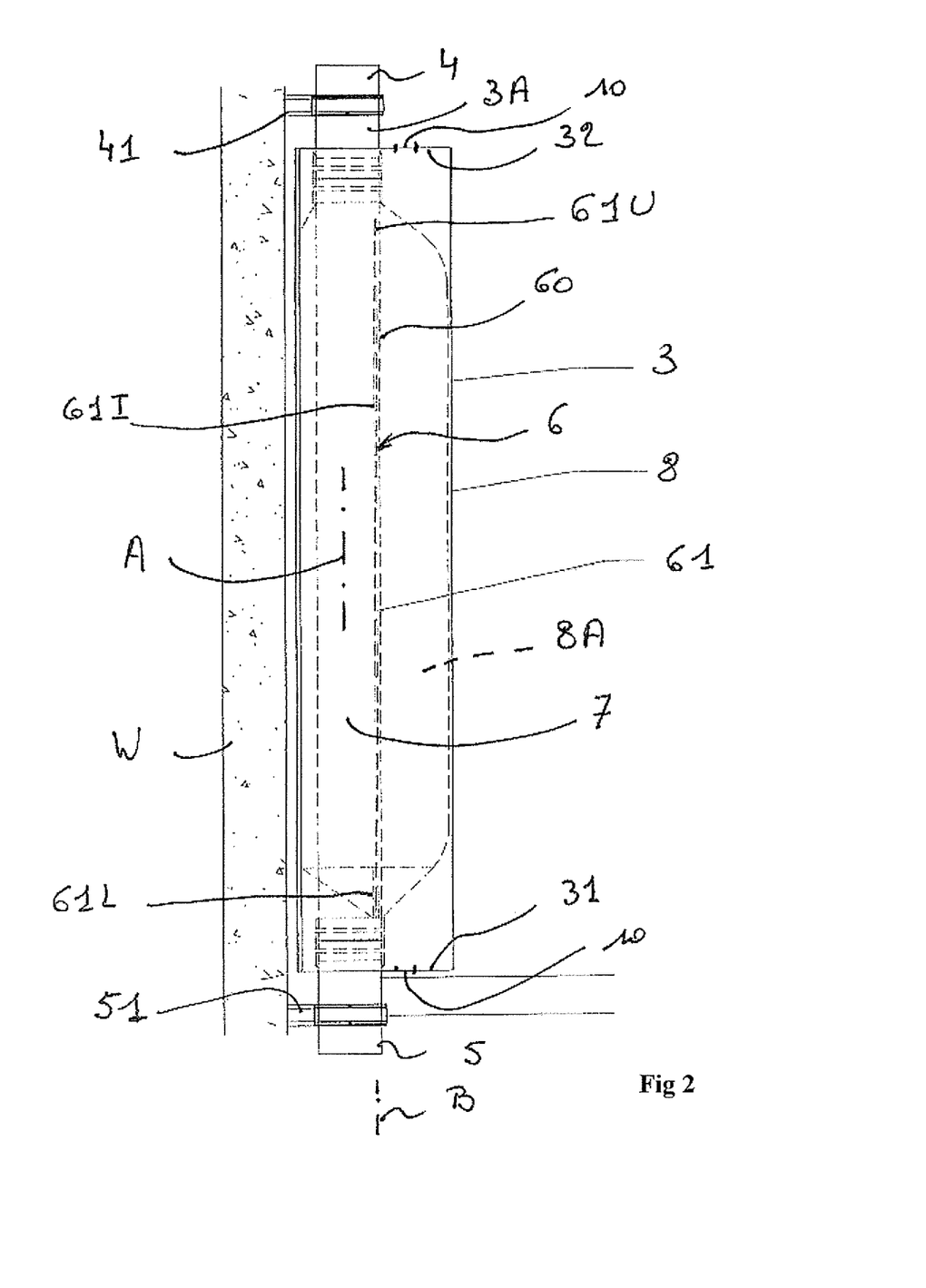
FIG. 2 is a lateral side view of the positive air pressure attenuation device of FIG. 1.
Figure 3:
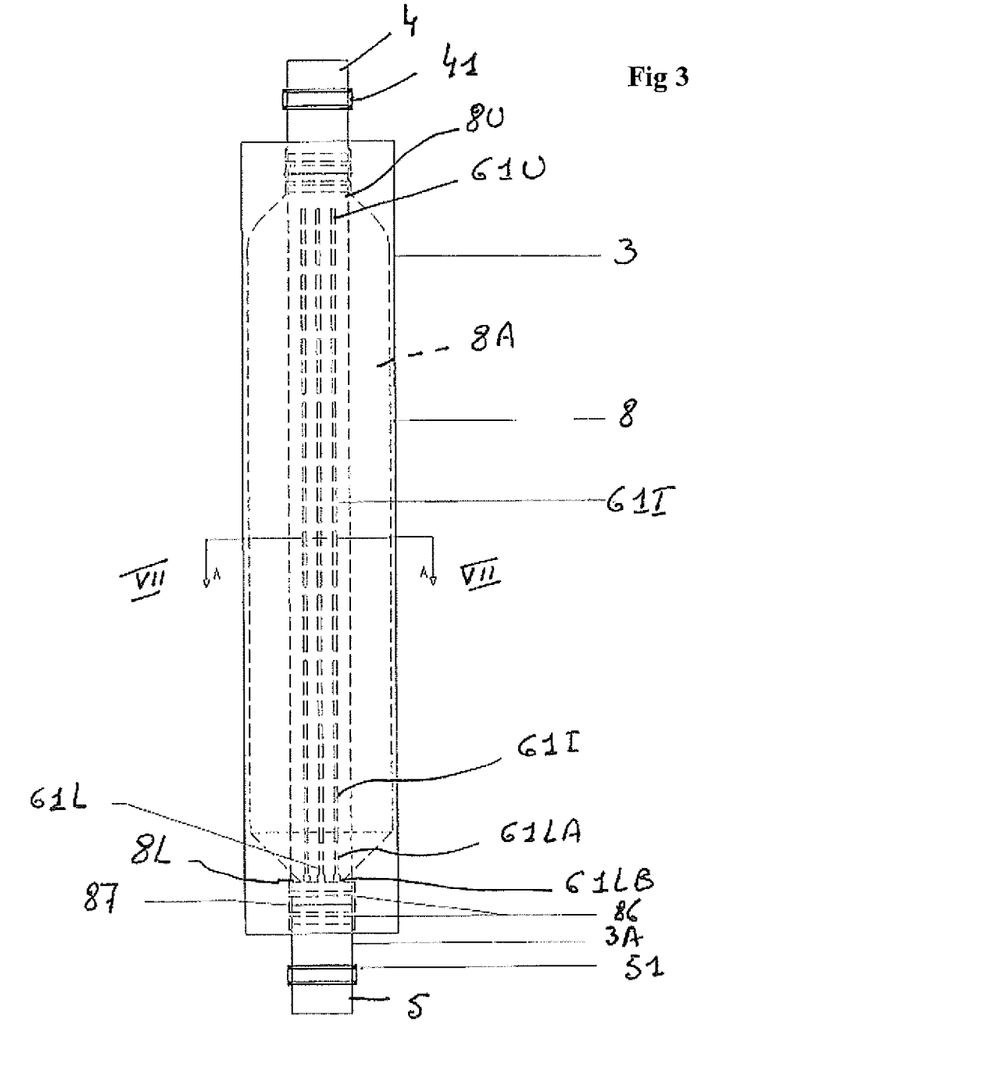
FIG. 3 is front view of the positive air pressure attenuation device of FIG. 1 with the flexible reservoir (8) fully inflated.

The device comprises (see FIGS. 2 and 3):

an advantageously substantially cylindrical external housing or casing (3) including structure or means (like support elements 31, 32 with openings) for connecting the housing to the drainage system (D) and having a pipe (3A) with an inlet (4) (located outside the casing 3), an outlet (5) (located outside the casing 3 and distinct from the inlet 4) and an inner central portion (6) located between said inlet (4) and outlet (5) within the housing or casing (3), said central portion (6) with a channel (7) for conducting draining liquid material from the inlet (4) towards the outlet (5), said channel (7) having a central axis (A);

fixation means 41, 51 for attaching respectively the inlet and the outlet pipe portion extending outside the casing or housing 3 to a wall W of the building (other fixation means can be suitable, for example for attaching the casing 3 to the wall W), an elastic inflatable flexible reservoir (8) (shown in fully inflated position within the casing 3) secured to the inner central portion (6) of the pipe (3A), the reservoir (8) being operable on a positive air pressure transient within the drainage system (D), said flexible reservoir (8) defining a reservoir chamber (8A) with a variable volume, said flexible reservoir being at east partly made to withstand a positive air pressure transient comprised between 10,000 Pa and 2,000,000 Pa, (the flexible reservoir 8 is thus able to be inflated within the casing against the elasticity of the flexible reservoir, in case of excessive air transient pressure, as pressure of 10,000 Pa to 2,000,000 Pa above the atmospheric pressure. For example, the maximum inflation of the flexible reservoir 8 is achieved for a transient pressure equal to or higher than 200,000 Pa, such as equal to or higher than 500,000 Pa).

The external casing (3) (for example in the shape of a tube) covers at least partly (advantageously completely) the flexible reservoir (8) and having at least one air passage way (10) adapted for ensuring at least the portion of the flexible reservoir (8) located into the housing (3) to be in contact with atmospheric air during operation of the device, meaning thus that inflation of the elastic flexible reservoir 8 is function of the difference of pressure inside the inner central portion 6 with respect to the atmospheric pressure.

The inner central portion (6) of the pipe 3A has a wall portion (60) extending within the reservoir chamber (8A), said wall portion (60) being provided with a plurality of openings (61) forming passages between the channel (7) of the central inner portion (6) and the flexible reservoir chamber (8A), said wall portion (60) defining a total closed surface within the reservoir chamber (8A) and a total open surface between the channel (7) and the reservoir chamber (8A).

Said plurality of openings (61) comprises: (a) one or more than one, preferably two or more than two lower elongated openings (61L) located in the inner central portion (6) adjacent to the outlet (5), said one or more lower elongated openings (61L) having a portion with an axis (B) substantially parallel to the central axis (A) of the inner central portion (6), and (b) one or more than one, preferably two or more than two upper openings (61U) located in the inner central portion (6) adjacent to the inlet (4) said plurality of openings (61) defining a total open surface such that the ratio total open surface of the openings (61)/total closed surface of the wall (60) is comprised from 1:100 to 1:4, advantageously from 1:50 to 1:8, preferably from 1:40 to 1:10.

The device of the invention has thus a pipe portion 6 which will form a part of the vertical drainage stack pipe D, through which grey and/or black waters, like waste water from toilets, bathrooms, kitchens, etc. issued from an upper stack drain pipe portion are flowing down into a bottom drain pipe portion.

Advantageously, said plurality of openings (61) comprises also one or more intermediate openings (61I) located in the inner central portion extending at a level comprised between the plane perpendicular to the central axis (A) comprising the upper point of the lower elongated opening(s) 61L, and the plane perpendicular to to the central axis (A) comprising the lower point of the upper opening(s) (61U).

The positive air pressure attenuation device 1 of the shown embodiment (preferred embodiment only disclosed for description purposes) has the following further characteristics:

the device comprises an (advantageously cylindrical) external housing or casing (3) including structure or means (like support elements 31, 32 with openings) for connecting the housing to the drainage system (D) and having a pipe (3A) with an inlet (4) (located outside the casing 3), an outlet (5) (located outside the casing 3 and distinct from the inlet 4) and an inner central portion (6) located between said inlet (4) and outlet (5) within the housing or casing (3), said central portion (6) with a channel (7) for conducting draining liquid material from the inlet (4) towards the outlet (5), said channel (7) having a central axis (A);

the one or more upper openings 61U and the one or more intermediate openings 61I are elongated opening(s) having a portion with an axis (B) substantially parallel to the central axis (A) of the inner central portion (6).

the one or more lower openings (61L), the one or more upper openings (61U) and the one or more intermediate openings (61I) are each elongated openings.

Figure 4:
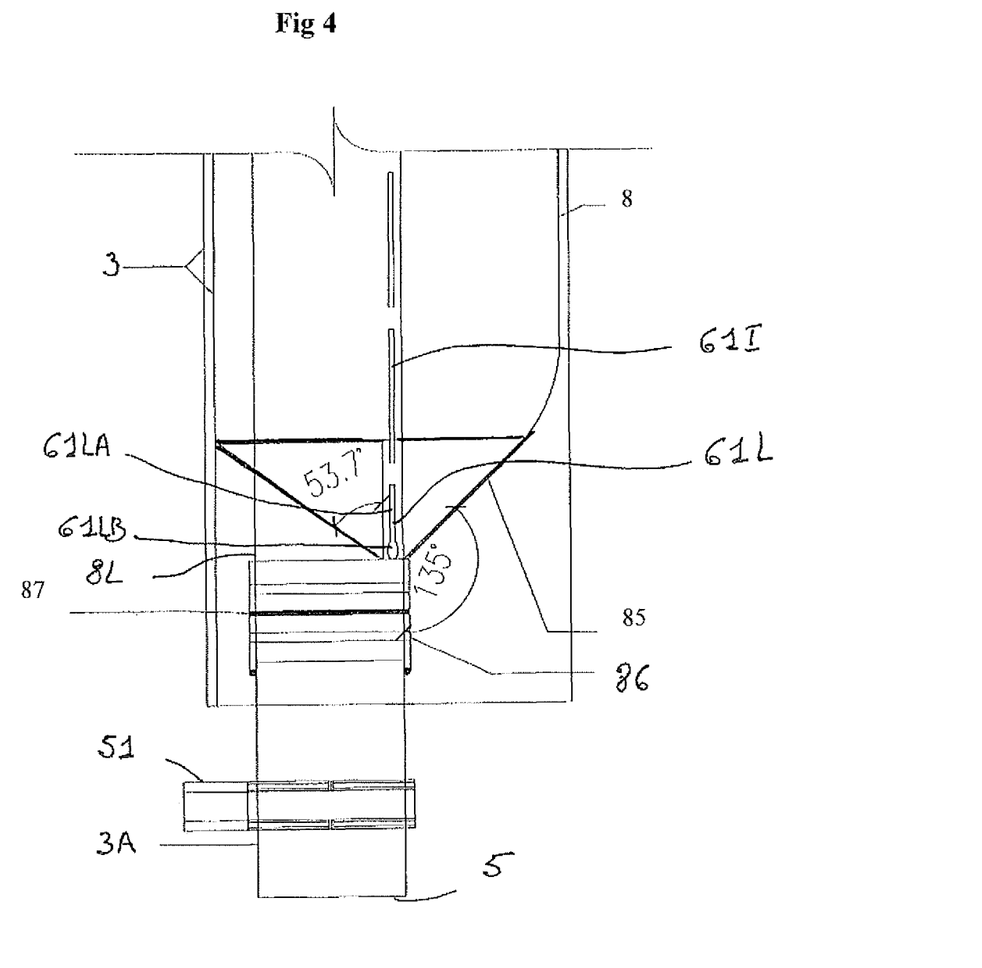
FIG. 4 is an enlarged view of the bottom portion of the positive air pressure attenuation device of FIG. 1.
Figure 5:
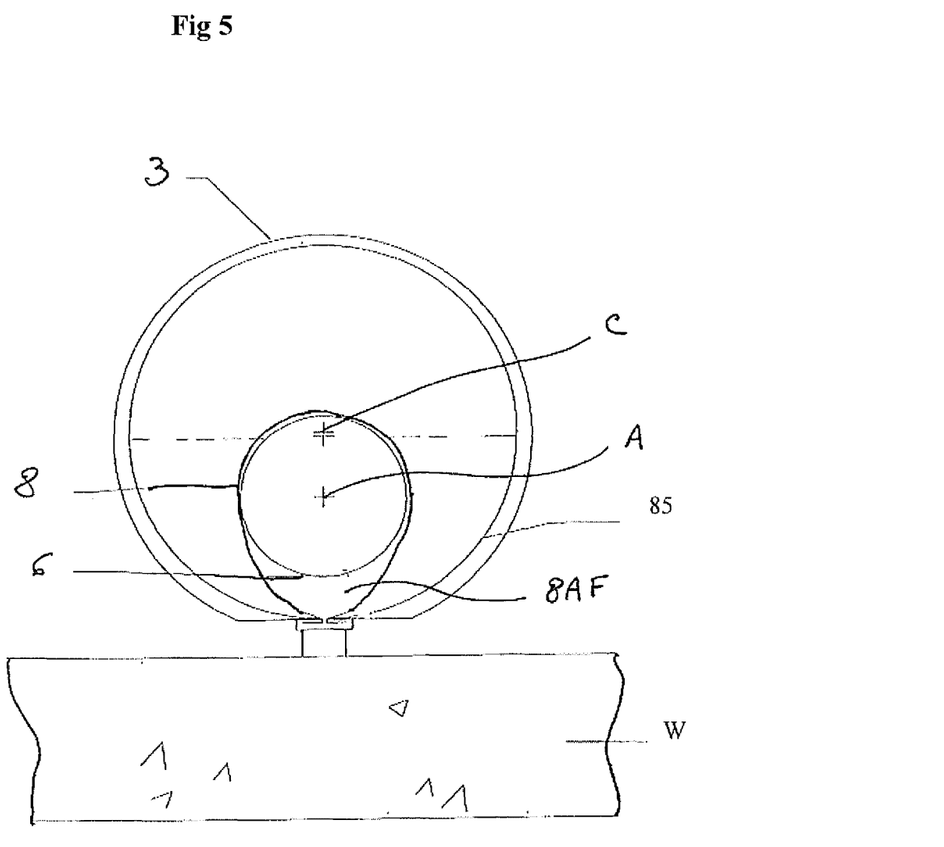
FIGS. 5 to 7 are cross section views of the positive air pressure attenuation device of FIG. 1, said views showing the non inflated position (represented in FIG. 5), the semi-inflated position (represented in FIG. 6) and the fully inflated position (represented in FIG. 7) of the flexible reservoir (8).
Figure 6:
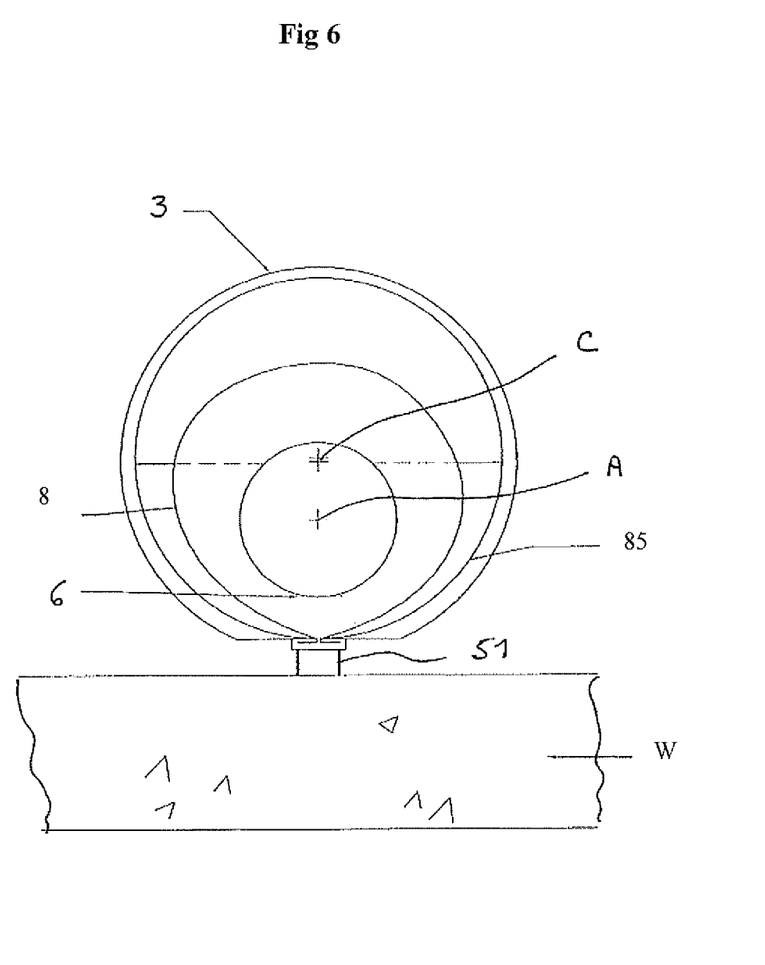
Figure 7:
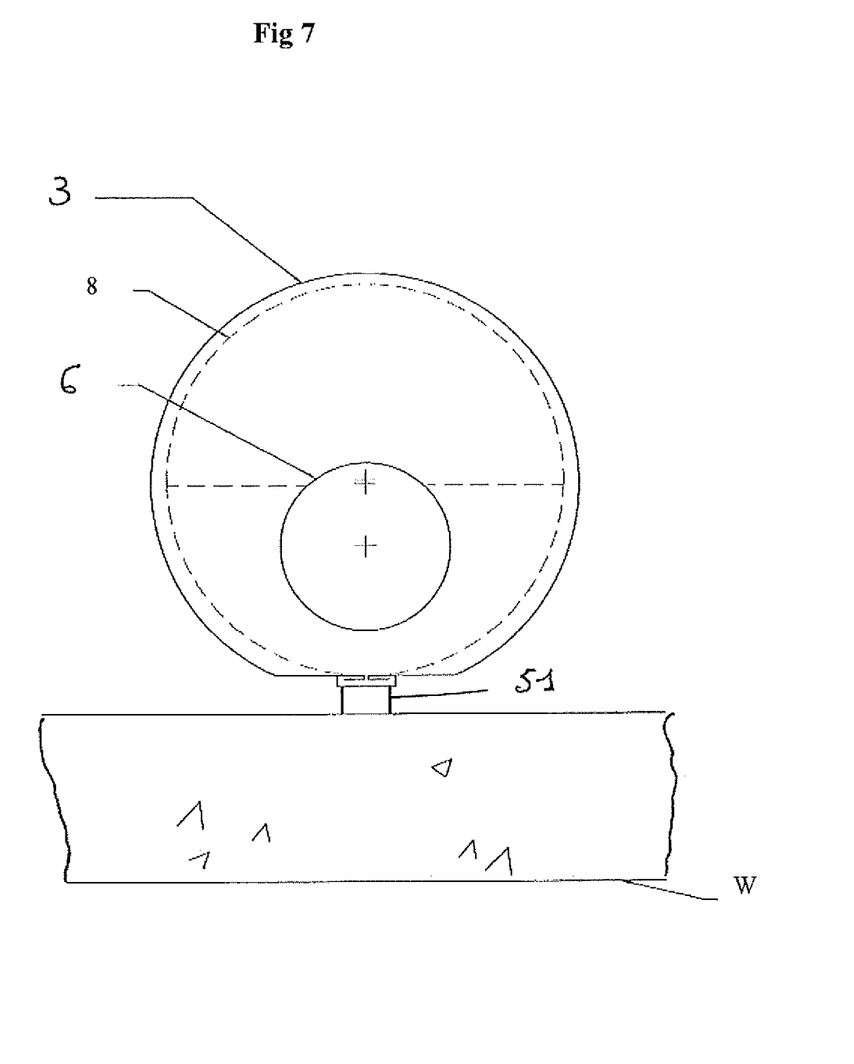

The positive air pressure attenuation device comprises at least one line of openings comprising a lower opening (61L), an upper opening (61U), and a plurality of intermediate openings (61I), whereby said line of openings or said lines of openings extend parallel to the central axis (A) of the inner central portion. In the embodiment shown the central portion 6 is provided with a set of three distinct parallel lines of openings, located on a sector of the central portion (advantageously cylindrical) of less than 180°, such as from 20° to 100°.

the inner central portion (6) is provided with a plurality of slot intermediate openings (61I) located between the lower elongated openings and the upper openings, whereby two successive openings are distant from each other by a distance measured parallel to the central axis (A) in the range of 5 mm to 100 mm.

the slot intermediate openings (61I) and/or the slot lower opening(s) 61L and/or the slot upper opening(s) 61U have a length in the range of 5 mm to 300 mm, and an average breath in the range of 5 to 30 mm. The breath of one elongated opening is measured perpendicular to the axis of the elongated opening considered.

the inner central portion (6) has a length in the range of 50 cm to 300 cm.

the flexible reservoir forms a flexible containment 8 in which the inner central portion (6) extends, said flexible containment 8 being made in a gas tight elastic material, whereby the reservoir is inflatable up to a maximum volume.

the flexible reservoir 8 defines a free chamber 8AF (see FIG. 5—the free chamber 8AF is a portion of the total reservoir chamber when inflated) outside the inner central portion (6), said free chamber having a maximum volume limited within the external casing (3), whereby the free chamber has a maximum volume in the range of 0.5 to 10 times (such as in the range of 1 to 4 times) the volume of the inner central portion (6). The maximum volume of the said free chamber (achieved when the flexible reservoir is fully inflated) can be for example comprised between 50 litres and 300 litres, or even more if required. FIG. 5 shows the flexible reservoir in a not inflated position, i.e. when the pressure within the central portion 6 is below a defined pressure, for example a pressure of less than 5000 Pa above the atmospheric pressure. FIG. 6 shows the flexible reservoir in a semi-inflated position, the deformation of the reservoir being operated against the elasticity of the reservoir. FIG. 7 shows the flexible reservoir fully inflated, and contacting the wall of the housing 3.

the elastic material used for the flexible reservoir 8 is for advantageously adapted or selected so as to have a quite regular volume expansion (advantageously above a minimum pressure) of the flexible reservoir in function of the pressure inside the central portion (6).

the at least one or more lower elongated openings (61L) (see FIG. 4) has/have each an elongated portion (61LA, advantageously parallel to the central axis A) with an average breath (determined perpendicular to the central axis of the elongated portion) and a bottom portion (61LB) located downwards the elongated portion (61LA), whereby said bottom portion (61LB) has a maximal breath comprised between 1.5 and 4 times the breadth of the elongated portion, said bottom portion having preferably a substantially oval or circular form with a diameter or shortest diameter comprised between 1.5 and 4 times the average breath of the elongated portion.

during the operation of the device, the lower end of the reservoir chamber is adapted or shaped to form, when inflated, a funnel shaped portion (80) with a bottom communicating with the at least one or more lower elongated bottom/lower openings (61L), so as to enable possible liquid material present in the reservoir chamber (8A) to flow through said at least one or more lower elongated openings (61L) back into the inner central portion (6). The elastic return force of the flexible reservoir or containment towards the central portion 6 will further push possible liquid material within the reservoir chamber 8A within the pipe 6 through openings, especially the lower openings 61L. For having a better control of the funnel shaped portion of the bottom portion of the inflated reservoir 8, the casing 3 can be associated to a stiffened funnel shaped collar 85 with an angle varying from about 40 to 65°, such as from about 45° (180-135) to about 55°. The lower end of the flexible reservoir 8, when inflated, follows then the shape of said stiffened collar 85, the outer face of the flexible container or reservoir 8 contacting the face of the collar 85. Said collar 85 has for example substantially the shape of a funnel, with an eccentric opening for enabling the passage of the pipe 6, as well as the end portion of the flexible membrane of the container 8. The ends 8L, 8U of the elastic flexible membrane (having in its non inflated form, the shape of an elastic gas tight tube membrane) are connected to the pipe 3A by a fixation means, advantageously a clips system 86 (like a jubilee system), with interposition of one or more moulded ribs, like circular ribs or rings 87. The stiffened collar 85 can be freely mounted around the pipe 3A, the correct position being ensured due to the eccentric position of the central opening of the collar 85, as well by the eccentric position of the pipe 3A within the casing or housing 3. The collar 85 is adapted for directing possible liquid within the flexible reservoir chamber 8A towards the bottom portion 61LB of one or more elongated lower openings (61L) of the inner central portion 6 of the pipe 3A.

the external casing/housing (3) has a central axis (C) parallel to the central axis (A) of the inner central portion (6), but distant from the central axis (A) from the inner central portion (6). This enables the position of the casing 3 more adjacent to the wall W.

the inner central portion (6) is provided with three or more than three lines of elongated openings 61, said lines being parallel to the central axis (A) of the inner central portion (6).

the flexible reservoir 8 defines outside the inner central portion 6 of the pipe 3A of the housing a free volume 8FV varying in function of the pressure within the inner central portion 6 from a minimum volume 8FV1 (see FIG. 5) and a maximum volume 8FV2 (see FIG. 7), whereby the minimum volume corresponds to a position for which the flexible reservoir 8 is not inflated (no or low positive air pressure transient with respect to the atmospheric pressure) and has a flexible wall at least partly contacting the outer face of the central portion of the inner pipe 6 (for example contacting at least a portion of the surface of the pipe provided with the elongated openings 61), while the maximum volume 8FV2 corresponds to a position for which the flexible reservoir 8 is fully inflated and has a flexible wall at least partly contacting the external casing (3).

The flexible reservoir 8 is such that in its non inflated position (FIG. 5), a portion of the wall of the flexible reservoir 8 is not contacting the outer face of the central portion of the inner pipe 6, whereby defining a minimum air volume 8FV1 within the flexible reservoir, but outside the pipe 6. Said minimum air volume forms a kind of air cushion, facilitating the inflation of the flexible reservoir, as soon as the pressure with the pipe is above a minimum pressure level. Said minimum air volume is advantageously comprised between about 2 to 10% of the maximum air volume 8FV2 of the fully inflated flexible reservoir contacting the external casing 3. Said minimum air volume also form an air channel outside the central portion 6 between the upper openings 61U and the lower openings 61L.

The elastic flexible inflatable reservoir (8) associated to the inner central portion (6) of the pipe (3A) is inflatable between a first position defining a minimum volume within the reservoir (8) and a second position defining a maximum volume within the reservoir (8), whereby in said first position the elastic flexible inflatable reservoir contacts a portion of the inner central portion of the pipe (3A) provided with at least one lower elongated opening (61L) so as to completely close at least one lower elongated opening (61L) extending between a lower end and an upper end, whereby in said second position the elastic flexible inflatable reservoir is moved away from the inner central portion so as to open the said lower elongated opening completely closed in the first position, whereby in said second position of the flexible inflatable reservoir (8), the distance between the flexible inflatable reservoir (8) and the lower elongated opening completely closed in the first position increases progressively from the lower end of said lower elongated opening. At the level of said lower elongated opening, in the inflated position, the distance between the flexible reservoir 8 and the said lower elongated opening is minimal at the level of the lower end of said opening (61L), while being greater than said minimal distance at the level of the upper end of the said opening (61L).

The pipe 6 can be manufactured in various materials, like thermoplastics, such as PVC and/or ABS based materials. The pipe will preferably provided with a non stick coating, like a fluoro coating. The thickness and diameter of the pipe will be advantageously the same as used in the main drainage pipe.

The flexible containment or reservoir 8 is made of a gas tight elastic material, like a rubber material, neoprene, isoprene, butyl rubber, etc. The thickness is for example from 500 µm up to 5 mm, advantageously from about 500 µm up to 2 mm.

The stiffened collar 85 is for example manufactured in thermoplastic material, like PVC, Nylon, etc.

The casing 3 is for example manufactured in PVC, ABS or other thermoplastic material. The casing has advantageously a substantially cylindrical shape, but other shapes are possible for the casing 3

The invention claimed is:

1. A positive air pressure attenuation device—specifically adapted for use in a drainage system of a building for draining at least draining liquid material, the device comprising:
   a housing including a structure for connecting the housing to the drainage system and being associated to a pipe—with an inlet, an outlet, and an inner central portion located within the housing between said inlet and outlet, said inner central portion forming a channel for conducting draining liquid material from the inlet towards the outlet, said channel having a central axis (A); and an elastic flexible inflatable reservoir associated to the inner central portion of the pipe, the reservoir being operable on a positive air pressure transient within the drainage system, said flexible reservoir defining a reservoir chamber with a variable inflatable volume, said flexible reservoir being at least partly made to withstand a positive air pressure transient of at least 5,000 Pa, whereby the housing forms an external casing covering at least partly the flexible reservoir and having at least one air passageway adapted for ensuring at least the portion of the flexible reservoir located into the housing to be in contact with atmospheric air during operation of the device, whereby the inner central portion of the pipe has a wall portion extending within the reservoir chamber, said wall portion being provided with a plurality of openings forming passages between the channel and the reservoir chamber, said wall portion defining a total closed surface within the reservoir chamber and a total open surface between the channel and the reservoir chamber, whereby said plurality of openings comprises: (a) one or more than one lower elongated opening(s) located in the inner central portion adjacent to the outlet, said one or more lower elongated opening(s) having a portion with an axis (B) substantially parallel to the central axis (A) of the inner central portion, and (b) one or more than one upper opening(s), advantageously upper elongated opening(s), located in the inner central portion adjacent to the inlet, said plurality of openings defining a total open surface such that the ratio total open surface of the openings/total closed surface of the wall is comprised from 1:100 to 1:4.

2. The positive air pressure attenuation device of claim 1, in which said plurality of openings comprises also one or more intermediate openings located in the inner central portion extending at a level comprised between the plane perpendicular to the central axis (A) comprising the upper point of the lower elongated opening(s), and the plane perpendicular to the central axis (A) comprising the lower point of the upper opening(s).

3. The positive air pressure attenuation device of claim 1, in which the one or more openings selected from the upper openings and/or the intermediate opening(s) is/are elongated opening(s) having a portion with an axis (B) substantially parallel to the central axis (A) of the channel.

4. The positive air pressure attenuation device of claim 1, in which the one or more lower openings, the one or more upper openings and the one or more intermediate openings are each elongated opening.

5. The positive air pressure attenuation device of claim 1, which comprises at least one line of openings comprising a lower opening, an upper opening, and a plurality of intermediate openings, whereby said line of openings or said lines of openings extend parallel to the central axis (A) of the channel.

6. The positive air pressure attenuation device of claim 1, in which the inner central portion is provided with a plurality of slot intermediate openings located between the lower elongated opening(s) and the upper opening(s), advantageously the upper elongated opening(s), whereby two successive slot intermediate openings are distant from each other by a distance measured parallel to the central axis (A) in the range of 5 mm to 100 mm.

7. The positive air pressure attenuation device of claim 6, in which the slot intermediate openings and/or the slot or elongated lower opening(s) and/or the slot or elongated upper opening(s) have a length in the range of 5 mm to 300 mm, and an average breath in the range of 5 mm to 30 mm.

8. The positive air pressure attenuation device of claim 1, in which the inner central portion has a length in the range of 50 cm to 300 cm.

9. The positive air pressure attenuation device of claim 1, in which the flexible reservoir forms an elastic inflatable flexible containment in which the inner central portion extends, said elastic inflatable flexible containment being made in a gas tight material.

10. The positive air pressure attenuation device of claim 1, in which the flexible reservoir defines a free chamber outside the inner central portion, said free chamber having a maximum volume limited within the housing, whereby the free chamber has a maximum volume in the range of 0.5 to 10 times, advantageously in the range of 0.5 to 5 times the volume of the inner central portion.

11. The positive air pressure attenuation device of claim 1, in which the at least one or more lower elongated openings has/have each an elongated portion and a bottom portion located downwards the elongated portion, whereby said bottom portion has a breath or diameter comprised between 1.5 and 4 times the average breath of the elongated portion, said bottom portion having preferably a substantially oval or circular form with a diameter or small diameter comprised between 1.5 and 4 times the average breath of the elongated portion.

12. The positive air pressure attenuation device of claim 1, in which during the operation of the device, the lower end of the reservoir chamber is adapted to form or is associated to an element for forming a funnel shaped portion with a bottom communicating with the at least one or more lower elongated openings, so as to enable liquid material present in the reservoir chamber to flow through said at least one or more lower elongated openings back into the inner central portion.

13. The positive air pressure attenuation device of claim 1, in which the housing has a central axis (C) parallel to the central axis (A) of the inner central portion, but distant or eccentric from the central axis (A) from the inner central portion.

14. The positive air pressure attenuation device of claim 1, in which the inner central portion is provided with three or more than three lines of elongated openings, said lines being parallel to the central axis (A) of the inner central portion.

15. The positive air pressure attenuation device of claim 1, in which the flexible reservoir defines outside the inner pipe of the housing a free volume varying in function of the pressure within the inner pipe from a minimum volume up to a maximum volume, whereby the minimum volume corresponds to a position of the flexible reservoir with respect to the inner central portion for which the flexible reservoir is not inflated and has a flexible wall at least partly contacting the outer face of the central portion of the pipe, while the maximum volume corresponds to a position for which the flexible reservoir is inflated and has a flexible wall at least partly contacting the external casing, whereby advantageously the flexible reservoir is such that in its non-inflated position, a portion of the wall of the flexible reservoir is not contacting the outer face of the central portion of the pipe, whereby defining a minimum free chamber volume within the flexible reservoir, said minimum free chamber volume being advantageously comprised between about 2 to 10% of the maximum air volume of the inflated flexible reservoir contacting the housing.

16. Drainage system for a building comprising a drainage stack with at least one substantially vertical drainage portion, whereby said substantially vertical drainage portion comprises or is a positive air pressure attenuation device of claim 1.

17. Use of a positive air pressure attenuation device of claim 1, in a drainage system of a building.

18. The positive air pressure attenuation device of claim 1, wherein said flexible reservoir is at least partly made to withstand a positive air pressure transient between 10,000 Pa and 2,000,000 Pa.

19. The positive air pressure attenuation device of claim 1, wherein said flexible reservoir is at least partly made to withstand a positive air pressure transient between 10,000 Pa and 500,000 Pa.

20. The positive air pressure attenuation device of claim 1, wherein the ratio total open surface of the openings/total closed surface of the wall is comprised from 1:50 to 1:8.

21. The positive air pressure attenuation device of claim 1, wherein the ratio total open surface of the openings/total closed surface of the wall is comprised from 1:40 to 1:10.

* * * * *